United States Patent [19]

Sergeys

[11] 3,960,510

[45] June 1, 1976

[54] HONEYCOMB STRUCTURE FOR COUNTERCURRENT GAS FLOW

[75] Inventor: Francis John Sergeys, Kensington, Md.

[73] Assignee: W. R. Grace & Co., New York, N.Y.

[22] Filed: May 21, 1973

[21] Appl. No.: 362,622

[52] U.S. Cl. .................. 23/288 FB; 23/288 FC; 252/477 R
[51] Int. Cl.² ...................... B01J 8/02; B01J 35/04; F01N 3/15
[58] Field of Search ...... 23/288 F, 288 FB, 288 FC; 29/455 R; 60/296, 299, 301; 138/148; 252/477 R; 264/262, 264; 423/213.7

[56] References Cited
UNITED STATES PATENTS

| | | |
|---|---|---|
| 3,065,595 | 11/1962 | Gary .............................. 23/288 F |
| 3,544,264 | 12/1970 | Hardison ..................... 23/288 F X |
| 3,733,181 | 5/1973 | Tourtellotte et al. ............. 23/288 F |
| 3,741,725 | 6/1973 | Graham .......................... 423/213.7 |
| 3,823,555 | 7/1974 | Cole......................... 23/288 FC UX |
| 3,910,770 | 10/1975 | Kobylinski ..................... 23/288 FB |

*Primary Examiner*—Morris O. Wolk
*Assistant Examiner*—Michael S. Marcus
*Attorney, Agent, or Firm*—Joseph P. Nigon

[57] ABSTRACT

In a two-stage catalytic treatment of engine exhaust gases a monolithic catalyst structure having a first catalytic section concentric within a second catalytic section, the first and second sections being in spaced apart relation for nearly the entire length of the monolith. The structural arrangement aids in reducing the possiblity of catalyst breakage.

1 Claim, 5 Drawing Figures

HONEYCOMB STRUCTURE FOR COUNTERCURRENT GAS FLOW

BACKGROUND OF THE INVENTION

The present invention relates to an improved catalyst structure for use in the two stage treatment of an engine exhaust stream. More specifically, the improved monolith provides for the catalytic reduction of nitrogen oxides in a first stage catalyst section concentric within a second stage catalist section to which air has been added so that there may be a more complete oxidation of CO and residual hydrocarbons. The first and second stages are in a spaced apart relation for substantially the entire length of the monolith. This structure helps aleviate thermal stresses that would tend to crack the monolith.

The need to remove or convert the noxious components in vehicular exhaust gases is now well established as a means for overcoming general air pollution and the smog problem in specific geographical areas. Furthermore, it appears that it will be necessary to have either a catalytic reactor or thermal afterburner means to provide adequate removal of the noxious components from engine exhaust. It is, of course, realized that there are many types of converters which have been tried and which may be made available for engine exhaust treatment. However, a major problem has existed in connection with the removal of nitrogen oxides, CO, and hydrocarbons in a two stage system using monolithic catalysts.

It has been proposed to deposit both $NO_x$ and oxidation catalyst materials on a single ceramic honeycomb structure and by reversal of the gas flow to remove both $NO_x$ and hydrocarbons and CO. In actual practice, however, temperature differentials as high as 1200°F between the $NO_x$ and hydrocarbon/CO catalyst sections have been encountered. Severe breakage of the ceramic honeycomb has resulted because of stresses set up in the single ceramic structure.

U.S. Pat. No. 3,701,823, to Hardison, shows the use of a two-stage countercurrent catalyst system for removing noxious auto emissions. The first stage $NO_x$ catalyst, usually nodules, is contained within a non-perforate cylindrical metal housing which is circumscribed by a second non-perforate metal housing containing oxidation catalyst nodules Exhaust gases enter the upstream end of stage 1 and are subsequently stripped of $NO_x$. Upon exiting the downstream end of stage 1 the exhaust gases are mixed with air and forced countercurrently through stage 2 to be oxidized and finally vented to the atmosphere. The essential feature of Hardison's invention is that the second stage catalyst bed is maintained in a heat exchange relationship around the first catalyst stage to maintain the heat therein and to effect further oxidation and elimination of carbon monoxide and unburned hydrocarbons from the exhaust stream.

There are several disadvantages to this system. First, two distinctly different catalyst compositions must be prepared and loaded separately into a fairly complex mechanical arrangement of tubes, baffles, etc. Second, the inner housing of stage one would have to be made of a highly heat resistant and yet thermally conducting material. Furthermore, tests have shown that pelleted catalysts produce significantly higher back pressure in an exhaust system than monoliths. These disadvantages are reflected in increased manufacturing time, higher prices for the finished system, and lower performance.

Thus, it is an object of the present invention to provide a novel monolithic catalyst structure for use in a two-stage catalytic process for the treatment of exhaust gases to remove $NO_x$, hydrocarbons, and CO, which is not subject to thermal fracture.

It is catalyst further object of this invention to provide a novel catlayst structure for countercurrent gas flow which is of one piece construction, contains one uniform catalyst composition, and is simple and inexpensive to fabricate.

Broadly speaking, the present invention provides for a novel monolithic catalyst structure having a first catalytic section concentric within a second catalytic section, the two sections being in a spaced apart relationship for nearly the entire length of the monolith.

More specifically, the invention embodies a unitary cylindrically shaped ceramic honeycombed monolith coated with a catalyst composition capable of both reducing $NO_x$ and oxidizing hydrocarbons and CO, and comprising a first cyclindrical catalyst section spaced apart from a concentric second catalyst section by an annular groove extending almost to the opposite end of the cylindrical monolith.

Alternatively, the annular groove can extend from both ends of the monolith to an area near the center of the monolith.

The first step in the present invention involves the selection and preparation of a suitable monolithic catalyst support.

The monolithic support can be constructed of a substantially chemically inert rigid solid material capable of maintaining the shape and strength at high temperatures. Since the temperature in an auto exhaust muffler frequently reaches 1500°F or higher, the material must be able to withstand these temperatures as well as exposure to below zero temperatures under certain conditions.

The monolithic support material will generally have a density of about 0.5 to 1.05 grams per cubic centimeter. The surface of the support is free of glassy or amorphous matrices and may be somewhat porous and contain large pores. The superficial surface area of the carrier should be as large as is consistent with the acceptable low back pressure in a fluid flow system. Ordinarily, in the treatment of auto exhaust gases, the volume of catalyst and the superficial surface area are adjusted to provide a back pressure of less than about 3 inches of mercury and preferably less than 2 inches of mercury at maximum acceleration.

The openings through the body can be of any shape and size consistent with the desired superficial surface area and must be large enough to permit free passage of exhaust gases and to prevent plugging by particulate material that might be present in the gases. These openings are generally parallel and extend throughout the support from one end to the other. The openings are generally separated from one another by walls defining the openings and for most efficient operation the openings are distributed across essentially the entire face or cross section of the support that is subject to initial contact with the exhaust gases. The preferred material for preparing these monolithic structures is alpha-alumina although other chemically inert materials also give satisfactory results. Other refractory materials include, for example, mullite, magnesium silicates, iron, spodumene, cordierite, aluminum silicates, etc.

One of the princple advantages of distending the catalytically active agents on a monolithic structure rather than on nodules of an inert support is that the amount of surface area per cubic inch of engine piston displacement is substantially lower than the monolithic type supports. The amount of catalyst should be sufficient to provide about 5–200 square inches of superficial surface area per cubic inch of engine displacement with 10–80 square inches of surface area per cubic inch of engine displacement being preferred.

When the catalyst is distended on a pelleted support the amount of surface area is substantially higher, starting at about 150–250 square inches of catalyst surface per cubic inch of engine displacement, in most cases, above 165 square inches of surface area per cubic inch of engine displacement.

U.S. Pat. No. 3,331,787, to Keith, issued July 18, 1967, describes a process for preparing a coated monolithic support in some detail.

A preferred monolith of this invention is prepared by the steps of (1) preparing a composition comprising a ceramic filler, a polyolefin material, and a plasticizer, (2) shaping the material to form a flat sheet, (3) forming ribs on the flat sheet, (4) rolling the sheet back on itself, (5) heating prior to contact to fuse the sheet at the areas of contact, (6) extracting the plasticizer, (7) firing the ceramic material which remains.

The porous ceramic structure can be easily prepared from a starting material comprising a ceramic powder, a polyolefin, and a plasticizer. The components of the composition can vary in the following amounts and still provide a workable plastic composition: polyolefin 5–70 percent by volume, plasticizer 15–80 percent by weight, and filler 20–90 percent by weight. However, preferable ranges are polyolefin 5–50 percent by volume, plasticizer 20–60 percent by volume and filler 20–50 percent by volume.

As previously mentioned, a wide variety of inexpensive, finely divided ceramic materials is available for use as fillers: Metal oxides, and hydroxides, metal silicates and aluminates, naturally occurring clays, mica, etc., precipitated zirconates and ferrite compositions. The plasticizer can be selected from the group consisting of hydrocarbons, sulfonamide, coumarone, indene, asphalt, glycols, glycolethers, glycerin, alkyl phosphates, etc.

The polyolefin is most preferably a commercial particle form high molecular weight polyethylene, having a standard load melt index of 0.0, a high load melt index of 1.8, a density of 0.95 and a viscosity of 4.0 measured as 0.02 grams of polymer in 100 grams decalin at 130°F is used. However, any commercially available polyethylene or ethylenebutene copolymer having a stand load melt index of substantially 0 is entirely satisfactory.

The preferred mixing procedure is to feed the ceramic powder, the polyolefin and the plasticizer as separate streams to a compounding device where the components are heated to temperatures of about 300° to 500°F., and working the mix until it is uniform. The product is then cooled and reduced to a size convenient for feeding to a conventional extruder.

The next step of the process is sheet extrusion and embossing. These two process steps are most conveniently completed together. In a typical run, a sheet is made from the raw material prepared by the processes described above, with an extruder, and a sheet die.

The sheet, is extruded into the nip of two rolls spaced close to the die. One of the two rolls has axial grooves on the surface. Both rolls are heated to 180–250°F and a pressure is applied between the rolls to cause the hot plastic to flow into the grooves. The ribbed sheet is removed from the grooved roll, cooled and fed to the winding and heat sealing step. The effect of the rolls are to cool the sheet and solidify it sufficiently to give enough strength to enable removal from the grooved roll.

In this step, the sheet from the extruder is wound on a mandrel and heat sealed as it is wound. In a typical operation the sheet passes over a small roll with the back of the sheet, as well as the ribs on the wound roll, exposed to a source of air heated to from 350°–500°F, preferably about 450°F.

As the sheet is wound and heat sealed, the diameter increases and means must be provided to allow or cause the roll to move away from the center of the mandrel. One suitable way of accomplishing this is by providing arms with sliding bearings for the lay-on roll.

One of the characteristics of the product results from the spacing of the ribs. These ribs are spaced to provide a final product with uniform pore openings.

The ribs act as spacers to provide macroporosity. This type of shaping will produce a honeucomb honeycomb structure exhibiting both micro and macroporosity. The microporosity is achieved by the plasticizer extraction and the polyolefin which is eventually burned out.

Following heatsealing, the plasticizer is then extracted. This can be accomplished by any solvent in which the plasticizer is soluble. For example, when using a plasticizer such as mineral oil, hexane is a suitable solvent. When a water soluble plasticizer such as diethylene glycol is used, water is a suitable solvent. The removal of the plasticizer results in the formation of a microporous structure. In addition to providing greater porosity, the extraction of the plasticizer prior to burning off the polyolefin is of great value since the formation of the micropores facilitates escape of the gaseous combustion products which are formed when the polyolefin is burned off. This means that no relocation relative to one another of the ceramic particles are caused by the escaping gas, and good sintering is obtained.

After the plasticizer has been extracted, the structure is heated to above the degradation temperature of the thermoplastic so as to completely burn off the polyolefin. The degradation temperature will, of course, vary with the choice of polyolefin. For the high viscosity linear polyethylene that I prefer to use, a temperature in the range of at least 240° to 260°C. is greatly preferred to initiate degradation.

At a temperature of about 240°C. (when polyethylene is the polyolefin) the structure begins to turn black and at about 700°C. the structure begins to turn white, indicating that the thermoplastic has entirely burned off.

When the thermoplastic is completely burned off, the temperature is increased to that it which the particular powder sinters into a monolithic structure, still retaining the microporosity. When using the preferred ceramic powder, cordierite, a temperature of about 1300°–1450°C. is recommended. The temperature is held at the sintering point for about 2 hours and then The structure is allowed to cool slowly to room temperature. The cooling time is generally about 3–4 hours.

The resulting porous ceramic body appears identical in shape to the original plastic structure except that a slight linear shrinkage, 2–5 percent, takes place.

The monolithic structure is characterized by:
a. channels extending throughout the length of the monolith. These channels vary in width or diameter from 0.025 to 0.200 inches.
b. surface area 0.4 to 1.0 m²/g,
c. a porosity as measured by water absorbtion of 20–30 percent,
d. pore volume as measured by Mercury intrusion:

| ANGSTROM | PORE VOLUME cm³/g |
|---|---|
| 35 – 10,000 | 0.0974 |
| 140 – 10,000 | 0.019 |
| 600 – 10,000 | 0.045 |
| Greater Than 10,000 | 0.0988 |

The combination of these characteristics is critical when the monolith is to be used as an auto exhaust catalyst support. The uniform channels assure that the catalytic agent is distributed uniformly on the monolith. In addition, this uniformity greatly decreases the possibility that some of the pores would become filled with calalytic material thus decreasing the area of catalyst exposed to the exhaust gases.

The surface roughness is critical in that it allows the monolith to be coated by depositing a ceramic slip on the monolith. The ceramic slip may contain the catalytic agents when these agents are noble metals, thus assuring uniform distribution on the monolith. The slip may be deposited on the monolith and then impregnated with the catalytic agents. This method may be used when the catalytic agents are copper, nickel, etc. The monolith may also be directly impregnated with the catalytic metals as opposed to first coating it with a ceramic slip. In this case, the monolith is simply dipped or sprayed with a solution of the metals, then dried and calcined.

The porosity and pore size are important in that these characteristics limit the amount of catalyst deposited on the monolith and provide the sites for contact of the exhaust gases with the catalyst.

Once an appropriate monolith has been chosen the next step in the process of forming our novel catalyst structure is machining the monolith in such a way as to form two spaced apart concentric catalyst sections integral with each other near one end or form both ends of the structure. This operation can be performed at any one of several points in the previously mentioned process.

First, the machining can be done between the heat sealing and the plasticizer extracting steps; second, between the extracting and firing steps; or finally after the monolith has been fired. The first alternative is preferable.

In this case, the cutting operation is performed on the monolith when it is in the slightly flexible plasticized state rather than the fragile ceramic state of subsequent steps.

Machining is typically carried out by means of a cyclindrical O-shaped die which comprises a metallic cylinder sharpened about one end and rapidly rotated about its longitudinal axis to provide a cutting action. Many other types of circular cutting tools exist and could be used in place of the above mentioned apparatus.

Although the monolithic structure of the present invention will now be described in terms of a structure which will fit into a standard type auto exhaust muffler, there is no intent to limit my inventive concept to the size of the monolith.

A typical catalytic monolith for use in auto exhaust emission control is from 5 to 6 inches in diameter and 3 to 6 inches in length, with a cross sectional area of from 78.5 to 113 square inches. The size of the monolith is determined by the amount of exhaust gas produced by the engine. The channels which extend throughout the length of the monolith vary in diameter from 0.025 to 0.200 inches and the bulk density of the structure is from 20 to 60 pounds per cubic foot.

For the purposes of this invention, a standard monolith such as is described above is provided with two separate and concentric catalytic sections by machining out a hollow cylinder up to 0.25 inches wide whose axis of rotation is perpendicular to the base of the monolith, leaving a unitary section bridging the two catalytic sections which is at least 10 percent of the total length of the monolith.

A plug of non-porous sealing material, i.e., ceramic glue, monolithic starting material etc., is forced down into the machined out space and fused into place at the bottom by the heat of friction of the circular machining tool. The non-porous seal thus formed need be no more than a thickness sufficient to plug the channels of the monolith and prevent by-passing of either catalyst section.

Alternatively, the monolith can be machined from both ends with the non-porous plug positioned in the center of the structure.

The two catalyst sections formed in the machining and sealing steps, though concentric, should have similar surface or "face" areas.

In the auto exhaust treating embodiment of this invention, the outer catalyst section where oxidation of hydrocarbons and carbon monoxide takes place should have a face area which is approximately 60 percent of the total, since oxidation is the predominent process occurring. The remaining catalyst section which reduces nitrogen oxides accounts for 40 percent of the face area of the monolith.

In a proposed dual stage process for catalytically treating exhaust gases employing a unitary monolith, emissions are passed through the central region of the monolith under reducing conditions to remove $NO_x$. As these treated gases exit the down stream end of the monolith they are mixed with air and the combined stream then takes a reverse flow pattern through an emcompassing second catalyst region where there is an oxidizing reaction for the exhaust gas stream prior to discharge from the catalytic muffler.

When using a unitary monolith in a system such as is described above, temperature differentials as high as 1200°F between the reductive and oxidative catalyst regions have been encountered. Severe breakage of the ceramic honeycomb has resulted because of stresses set up in the single ceramic structure.

The present invention solves this particular problem by separating the two catalytic regions by an air space for nearly the entire length of the monolith. Thus, the two sections operating at different temperatures are out of mechanical communications and thermal stresses and dissipated. The monolithic "bridge" linking the two sections is at the downstream end at a point where the temperature differentials are likely to be the smallest.

After the monolith has been formed and machined the next step in the process of the present invention is rendering the monolith catalytically active. This can be done in any number of ways. The monolith can be coated with a ceramic slip containing the catalytic metals, or the slip may be deposited on the monolith and then impregnated with the catalytic agents. A preferred method comprises directly impregnating the monolith with solutions of the catalytic metals and then heat treating to fix them in place.

This invention contemplates applying a reductive catalytic composition to the first concentric section of the machined monolith, and an oxidative catalytic composition to the encompassing second section. However, in terms of ease of manufacture and reducing cost, it is preferred to distend one catalytic composition over the whole surface area of the monolith, which will reduce $NO_x$ under reducing conditions and oxidize hydrocarbons and CO when air is added to the system.

It is known that a variety of catalysts consisting of noble metals, base metals, or proper combination of these two can successfully convert noxious emissions from an automobile to less objectionable products, if the operating conditions for the catalytic device are favorably controlled.

U.S. Pat. No. 3,189,563, of Hauel, issued June 15, 1965, is typical of the patents relating to the use of noble metal catalysts for the conversion of automobile exhaust gases. U.S. Pat. No. 3,455,843, to Briggs, et al., issued July 15, 1969, is typical of a base metal catalyst system promoted with a noble metal. Unpromoted base metal catalysts have been described in U.S. Pat. No. 3,322,491, by Barrett, et al., issued May 30, 1967, U.S. Pat. No. 3,637,344, discloses the ruthenium/irridium system for $NO_x$ removal.

Without intending to limit the present invention to a particular catalyst composition the preferred impregnating step will be described in terms of distending nickel oxide and one or more noble metals on the machined monolithic support material.

The monolithic support is contacted by spraying, dipping, with a soluble, decomposable nickel salt, such as nickelous nitrate. The impregnation is normally carried out using a solution of the impregnate containing about 1 to 15 weight percent of the nickel salt. The impregnation is carried out to incipient wetness and the monolith is dried for a period of 4 to 6 hours at 200° to 300°F.

The conversion of nickelous nitrate to the oxide is conveniently carried out by air calcining the impregnated monolith at 800° to 1800°F for a period of about 1 to 4 hours.

The next step involves applying, by similar techniques as those described above, a solution of decomposable noble metal salts to the nickel oxide coated monolith. Examples of suitable salts include the nitrates, nitrites, the chlorides, the tetraamine nitrates of the noble metals and the oxychloride of ruthenium. More specifically, the noble metals to be used can be platinum, palladium, rhodium, ruthenium, or irridium, either alone or in combination.

The final step in the preparation of the catalyst is the conversion of the noble metal ions to either metal by reduction or metal oxide by oxidation. The reduction can be carried out by treatment with hydrogen or carbon monoxide at a temperature of about 300° to 1000°F for a period of 1 to 4 hours. The reduction can also be carried out by exposing the catalyst to vapor that will generate reducing agents such as hydrogen or carbon monoxide or both under suitable conditions. For example, the dried catalyst can be exposed to formic acid vapor at a temperature of about 140°F to 230°F for a period of 1 to 2 hours.

The conversion to metal oxide can be readily carried out by simple air calcining at 800° to 1800°F for a period of about 1 to 4 hours.

Alternate methods of preparation encompass a dissolution of both the noble metal salt and the nickel salt in the same solution and applying the mixed solution to the monolith in any convenient manner, such as dipping, spraying, etc., and finally subjecting the system to thermal activation.

A suitable catalyst for this invention is one in which the noble metal is palladium, platinum, or a combination of the two, and more specifically, palladium, or platinum promoted with either rhodium or irridium alone or in combination, and nickel oxide; all catalytically active materials being distended on a monolithic support.

The concentration of the noble metal component in the above catalyst composition is from 0.05 to 1 weight percent where unpromoted.

When the catalyst is the mixed system, the catalyst contains about 0.05 to 0.5 weight percent noble metal or metals, and about 1 to 15 percent nickel oxide. A particularly preferred catalyst of this type contains approximately 0.1 percent palladium, 0.0045 percent rhodium, and 5.74 percent nickel oxide.

Reference to the accompanying drawings and the following description thereof will serve to better illustrate the invention and set forth additional advantages in connection therewith.

Figure 1:
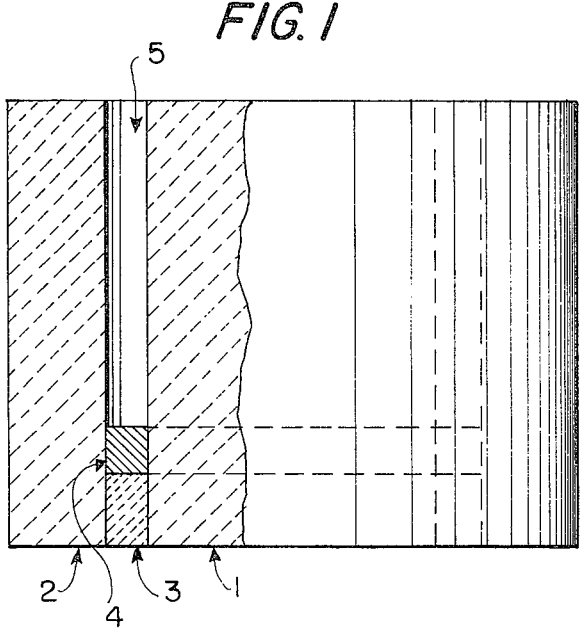
FIGS. 1, 2, 3 and 4 of the drawing show in cross-sectional views the configuration for the catalytic monolith.

Referring now particularly to FIG. 1 of the drawing, there is indicated an inner honeycomb, section 1, connected to a concentric outer honeycomb, section 2, by a bridge section 3. The bridge section 3, is sealed to prevent back flow by a non-porous ceramic seal, section 4. Sections 1 and 2 are separated by a machined out space, 5, extending from the upstream end to the bridge section 3.

Figure 2:
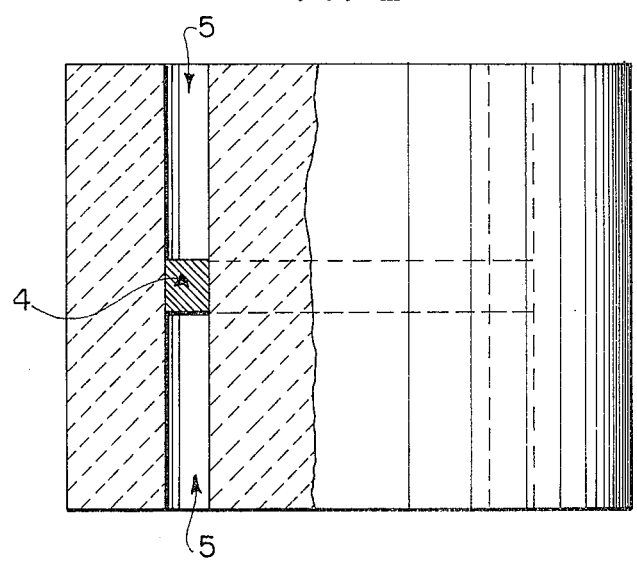

FIG. 2 shows an alternate embodiment of the structure wherein the channels 5 extend from both ends of the monolith the thr plug 4 is positioned near the center of the monolith.

Figure 3:
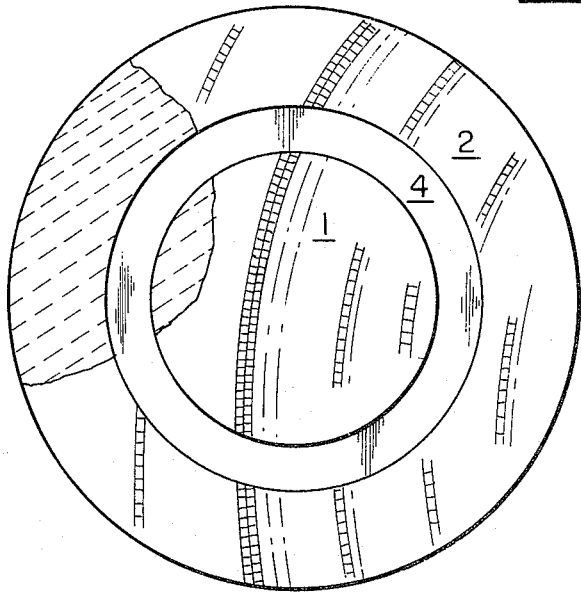

FIG. 3 is a cross sectional view of FIG. 1 showing the inner and outer honeycomb catalyst sections 1 and 2 and the non-porous ceramic seal, 4.

Figure 4:
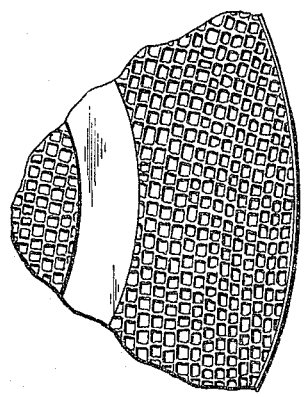

FIG. 4 is a fragmentary view of FIG. 3 at the indicated line, showing the fine pore structure of the monolith.

Figure 5:
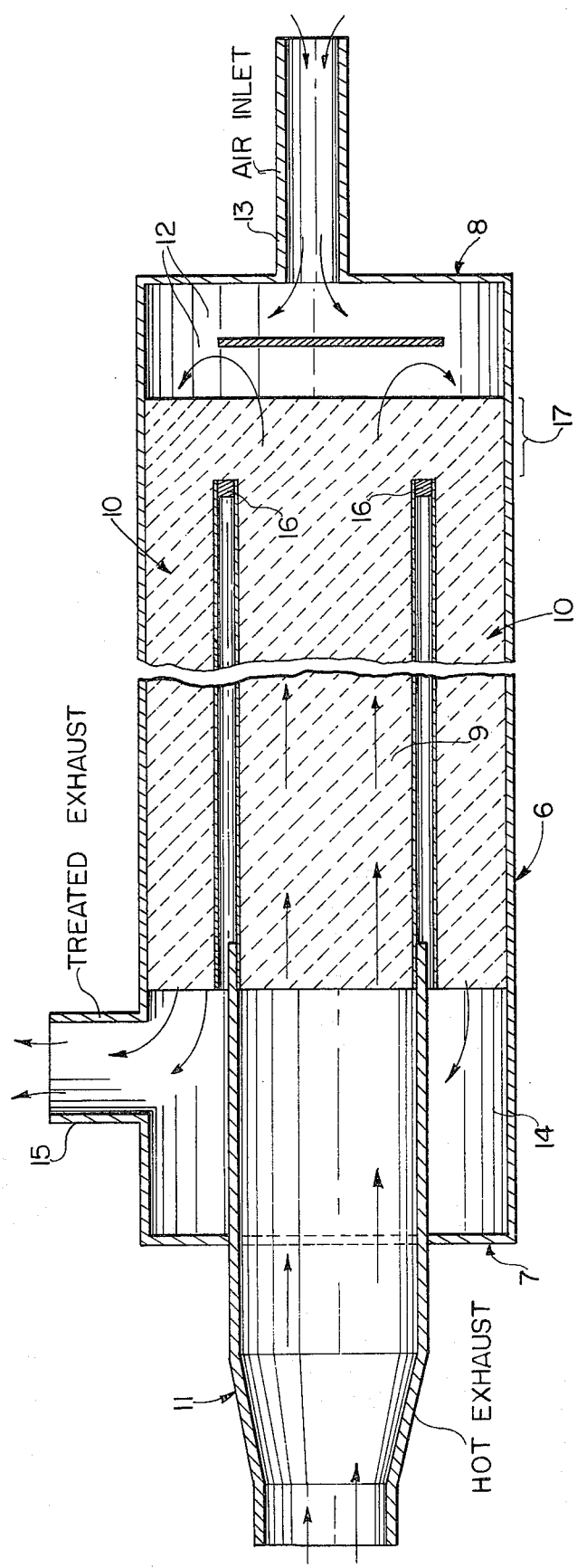
FIG. 5, of the drawing shows a simplified apparatus arrangement in diagramatic sectional view for the treatment of exhaust gases using the monolithic configuration of FIG. 1.

In FIG. 5 of the drawing, there is shown an embodiment of the present invention incorporating the monolithic configuration of FIGS. 1 through 4 in a typical catalytic exhaust muffler with an outer housing 6 having end sections 7 and 8 for containing an inner honeycomb reducing zone 9 and spaced apart outer honeycombed oxidizing zones 10. Zones 9 and 10 are connected by a honeycomb bridge zone, 17, and sealed from backflow by a nonporous ceramic seal 16. An exhaust gas inlet to the unit is provided through the inlet port means 11 which in turn connects with or communicates with the interior honeycombed reducing zone 9. A distribution zone 12 is provided whereby there is a reverse flow of the exhaust gas stream through the outer oxidizing zones 10. Provision is also made for the introduction of air by way of port means 13 into a redistribution section 12, whereby air will be uniformly mixed with the partially contacted gas stream entering zone 10. The fully treated exhaust stream will leave at the downstream end of these second stage catalyst zones 10 to enter an outlet plenum 14 and then be discharged by way of outlet port 15.

It will be seen that the embodiment of FIG. 5 provides for reducing and oxidizing catalyst contact by means of separate zones 9 and 10 which are part of a unitary ceramic structure. Zones 9 and 10 are in a spaced apart relation so that the temperature differential which exists between them will not cause structural failure.

It will be further noted that there is no air introduction into the first stage catalyst section in order to enhance the $NO_x$ reduction step at the high temperature conditions and to preclude the production of nitrogen oxides. The air that is added at the downstream end of this first stage zone 9 insures that there is adequate oxygen available for completion of the oxidation of CO and unburned hydrocarbons to harmless products that can be discharged by way of collection section 14 and outlet port 15.

What is claimed is:

1. A two stage converter for treating engine exhaust gases which comprises in combination a housing having end walls and a center tubular wall section, an exhaust gas inlet at one end of said housing, an elongated ceramic monolithic structure contained within said housing, said monolithic space having an inner longitudinally channelled section and an outer longitudinally channelled section, said exhaust gas inlet being connected to and in communication with the inner section of said monolithic structure whereby exhaust gases will pass directly from said inlet into said inner section, said sections being concentrically located within said housing and being annularly separated from each other to form an annular space therebetween along most of their lengths, said space preventing mechanical contact and thereby direct heat transfer contact of said sections along the length of said space, said sections being connected by a honeycomb bridge, said annular sapce being sealed by a ceramic plug to prevent exhaust gas backflow therethrough, an air inlet located at the end wall of said housing opposite said exhaust gas inlet, a baffle positioned perpendicular to said air inlet and said exhaust gas flow and an outlet plenum at the end of said housing opposite said air inlet and communicating with an outlet port said outlet plenum being defined by the end wall of said housing nearest said inlet, a portion of said center tubular wall abutting said end wall, the outer wall of said inlet and an end face of the outer longitudinally channeled section, said outlet plenum communicating the gases flowing through said outer section with the outlet port.

* * * * *

UNITED STATES PATENT AND TRADEMARK OFFICE
CERTIFICATE OF CORRECTION

PATENT NO. : 3,960,510
DATED : June 1, 1976
INVENTOR(S) : Francis John Sergeys

It is certified that error appears in the above-identified patent and that said Letters Patent are hereby corrected as shown below:

In column 10, claim 1, line 9: delete "space" and insert therefor --structure--.

Signed and Sealed this

Seventh Day of September 1976

[SEAL]

Attest:

RUTH C. MASON
*Attesting Officer*

C. MARSHALL DANN
*Commissioner of Patents and Trademarks*